United States Patent Office 2,816,631
Patented Dec. 17, 1957

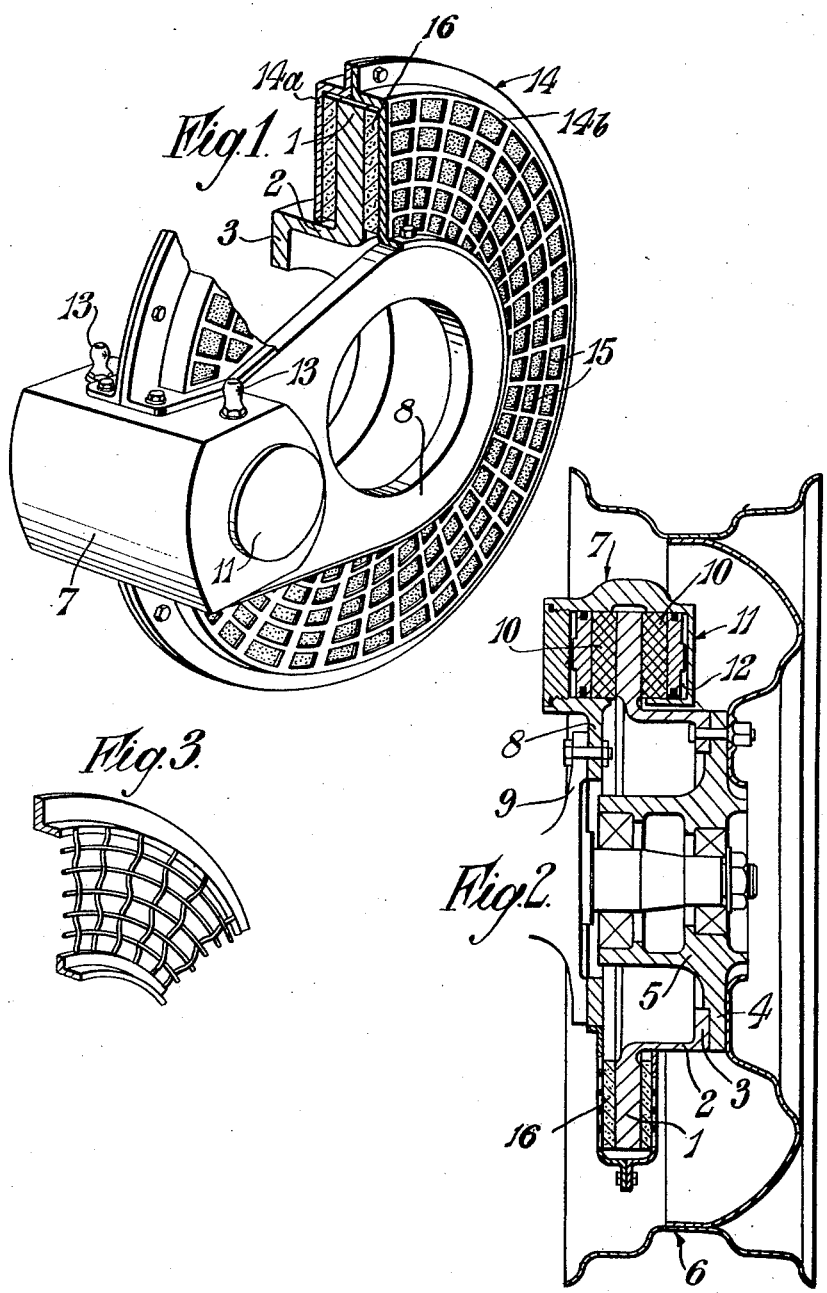

2,816,631

BRAKE ASSEMBLY

Henry James Butler, Sutton Coldfield, England, assignor to Dunlop Rubber Company Limited, Birmingham, England, a corporation of Great Britain Application March 15, 1956, Serial No. 571,831

6 Claims. (Cl. 188—264)

My invention relates to brakes and more particularly to a disc brake assembly for a motor vehicle and the like.

On applying a brake, considerable heat may be generated in the rotatable braking member and this in turn may cause brake fade, and a falling off in the efficiency of the brake. Disc brakes, in which the greater portion of the disc is rotating freely in the slipstream of the vehicle, have proved to be notably free from fade, since the heat generated on braking is rapidly dissipated into the atmosphere. Difficulties have arisen with such brakes, however, in that the braking surfaces are exposed to road dirt and the like.

In the invention of my co-pending application Ser. No. 229,967, filed June 5, 1951, and now Pat. No. 2,746,577, the exposed braking surfaces of the disc are covered with a thin shroud to protect them against contamination. In British Patent No. 711,059 it is proposed to make the shroud or casing liquid tight and to rotate the disc through a trough of cooling liquid. Both of these proposals, however, have certain disadvantages which are largely overcome by the brake assembly of my present invention.

According to my present invention a brake assembly comprises a rotatable braking member having a braking surface, brake applying means to co-act with a portion only of said surface, a non-rotatable casing located adjacent the remainder of said surface and conducting material located between said remainder of said surface and said casing to conduct away from said surface heat generated on braking.

Preferably the brake is a disc brake of the type described, for example, in co-pending application of Wright and Butler Ser. No. 207,148, filed January 22, 1955, now Pat. No. 2,790,516. The casing surrounds the braking surfaces of the disc and the casing may be perforated, or may be made of wire mesh, since in the present invention its only function is to hold the conducting material in place. The conducting material is preferably a metallic wool or sponge, compressed and formed into suitable shape. A compressed, knitted, wire fabric may be employed, or any other suitable conducting medium of this nature.

My invention is more fully illustrated by way of example in the accompanying drawings, in which:

Fig. 1 is a perspective, partly sectioned, view of a disc brake constructed in accordance with my invention, Fig. 2 is a vertical section through a vehicle wheel and a brake also constructed according to the invention, and Fig. 3 is a perspective view of part of an alternative form of casing.

Figs. 1 and 2 show two views of a vehicle disc brake which comprises an annular disc 1 provided at its inner periphery with an axially extending cylindrical portion 2, from the end of which an annular flange 3 extends radially inwardly and is secured by nuts and bolts to an annular flange 4 extending outwardly from the hub 5 of the wheel 6. The disc is thus rotatable with the wheel.

A non-rotatable housing 7 is provided which straddles the outer periphery of the disc at one location and said housing is provided with a flange 8 whereby the housing may be secured to a non-rotatable part of the wheel assembly 9. Within the housing there are provided two cylindrical pads 10 of friction material which are located one on each side of the disc and are axially slidable towards one another to frictionally engage the braking surfaces of the disc. A piston and cylinder mechanism 11, associated with the housing 7 is located on each side of the disc to effect said engagement, and a space 12 between the piston of each mechanism and the base of its associated cylinder is adapted to be connected, through connections 13, to a source of fluid pressure, for example, a master cylinder. A disc brake of this type is more fully described in the above mentioned application Ser. No. 207,148, now Patent No. 2,790,516.

An annular casing 14 is provided to enclose the braking surfaces of the disc, said casing being cut away to accommodate the brake housing 7 and flange 8. The casing is in two parts 14a and 14b, said parts being bolted together adjacent the outer periphery of the disc and the casing part 14b is also bolted to flange 8. Both parts of the casing are bolted to housing 7.

The radially extending sides of the casing are perforated, as shown at 15 and are spaced a short distance away from the braking surfaces of the disc. Located between each of the braking surfaces of the disc and the adjacent side of the casing is a member 16 of compressed metallic wire. The member 16 is thus an open mesh body of heat conductive filamentary material, the metallic wire being compressed but having open spaces which give it a resiliency to provide close contact with the brake disc. The member is part annular in shape, that is, the complete annulus is cut away to accommodate the brake housing. The radial depth of the members 16 is such that they cover substantially the entire braking surfaces of the disc 1 except where they are covered by the housing 7. The members 16 are slightly resilient and are fitted in compression between the disc and the casing.

The effect of this arrangement is that, as the brake is applied and the disc is heated by the frictional engagement of the pads, the members of compressed metallic wire, which are in contact with the braking surfaces of the disc, conduct the heat from the disc and through the members to the exterior surfaces thereof, where it is dissipated to the atmosphere in the normal way. By this means excessive build-up heat, which causes brake fade, is prevented, and at the same time the braking surfaces of the disc are shielded from road dirt and the like.

The annular members 16 of compressed metallic wire are preferably made of copper or a soft wire which will not score the braking surfaces of the disc. They may be made of a knitted wire or of a metallic wool or sponge of known type. They are compressed into a suitable shape and density before insertion into the casing.

While the primary function of the conducting member is to conduct heat away from the disc, it may also act as an effective filter and scourer as, for example, when the brakes have been through sandy water.

The function of the casing 14 is merely to securely enclose the annular members 16 and it may be made, for example, of wire mesh, substantially as illustrated in Fig. 3 of the drawings.

The casing and annular metallic conducting member may be fitted to one side of a brake disc only. The invention is equally applicable to drum brakes and to clutches. The metallic conducting metal need not be compressed metallic wire, metal wool or sponge; any other suitable conducting material could equally well be used.

On certain installations it may be advisable to locate a masking shield a short distance, of the order of 0.5 inch, away from the outer surfaces of the casing. This would prevent the container and conducting member from being fouled by mud and the like and at the same time provide a space for air circulation.

Having described my invention, what I claim is:

1. A brake assembly comprising a rotatable braking member having a braking surface; brake applying means to co-act with said braking surface throughout a portion only of its path of rotation; a non-rotatable casing located adjacent the remainder of said surface; and a compressed, open mesh body of heat conductive, resilient elements in said casing in contact with the rotatable braking member.

2. A brake assembly comprising a rotatable braking member having a braking surface, brake applying means to coact with said braking surface throughout a portion only of its path of rotation, a non-rotatable casing located adjacent the remainder of said surface, a compressed open mesh body of heat conductive filamentary material located between said remainder of said braking surface and said casing to conduct away from said surface heat generated on braking.

3. The brake assembly of claim 2 in which the braking member is an annular disc.

4. The brake assembly of claim 3 in which the non-rotatable casing encloses the disc and is spaced axially from the radially-extending braking surfaces thereof and the conducting material is located between said braking surfaces and the sides of the casing.

5. The brake assembly of claim 4 in which the radially-extending sides of the casing are perforated to facilitate heat transmission therethrough.

6. The brake assembly of claim 4 in which the radially-extending sides of the casing are made of wire mesh.

References Cited in the file of this patent

FOREIGN PATENTS

| | | |
|---|---|---|
| 693,919 | Great Britain | July 8, 1953 |
| 701,725 | Great Britain | Dec. 30, 1953 |
| 711,059 | Great Britain | June 23, 1954 |
| 1,102,431 | France | May 4, 1955 |